US005108834A

United States Patent [19]

Asazuma

[11] Patent Number: 5,108,834

[45] Date of Patent: Apr. 28, 1992

[54] SUPPORT FOR THERMOSENSITIVE RECORDING PAPER

[75] Inventor: Harumitsu Asazuma, Ibaraki, Japan

[73] Assignee: Oji Yuka Goseishi Co., Ltd., Tokyo, Japan

[21] Appl. No.: 631,347

[22] Filed: Dec. 20, 1990

[30] Foreign Application Priority Data

Dec. 21, 1989 [JP] Japan ................................ 1-332315

[51] Int. Cl.$^5$ ................................ B32B 5/16

[52] U.S. Cl. ................................ 428/323; 428/330; 428/480; 428/516; 428/910; 503/200

[58] Field of Search ............... 428/323, 516, 480, 330, 428/910; 503/200

[56] References Cited

U.S. PATENT DOCUMENTS 4,705,719 11/1987 Yamanaka et al. ................ 428/323

FOREIGN PATENT DOCUMENTS 234563 9/1987 European Pat. Off. .
283048 9/1988 European Pat. Off. .
345419 12/1989 European Pat. Off. .

OTHER PUBLICATIONS

Patent Abstracts of Japan, vol. 13, No. 305 (M-849) (3653), Jul. 13, 1989, and JP-A-01 95097 (Ojiyuka Gouseishi K.K.), Apr. 13, 1989, (the whole document).

*Primary Examiner*—Edith L. Buffalow
*Attorney, Agent, or Firm*—Oblon, Spivak, McClelland, Maier & Neustadt

[57] ABSTRACT

A support for thermosensitive recording paper, said support being synthetic paper composed of a laminated film comprising a base layer composed of a biaxially stretched resin film and a paper-like layer composed of a uniaxially stretched film of a thermoplastic resin containing 10 to 50% by weight of calcium carbonate powder in a support made of synthetic paper and to be coated with a thermosensitive color forming layer and said support meeting the following physical properties (i) to (iii):

(i) opacity is 45% or below as measured according to JIS P-8138, (ii) the paper-like layer to be coated with a thermosensitive color forming layer has Bekk smoothness of 100 to 300 sec and a surface roughness Ra of 1.5 $\mu m$ or below, and (iii) the support has a density of not higher than 1.1 $g/cm^3$.

4 Claims, No Drawings

SUPPORT FOR THERMOSENSITIVE RECORDING PAPER

FIELD OF THE INVENTION

This invention relates to a support for thermosensitive recording paper for drafting (drawing) use.

BACKGROUND OF THE INVENTION

There have been developed thermosensitive recording devices capable of charting high-quality pictures, equivalent to those of electrostatic plotter, at a high speed (10 to 25 mm/sec) as a substitute for a means for making drawing with electrostatic plotter of CAD or CAM. The thermosensitive recording devices are on sale at a price of about ½ of that of electrostatic plotter device.

Such raster scan method type thermosensitive recording device has an advantage in that operator can be liberated from blue printing work, since the same drawing can be continuously output on the level of the original drawing by utilizing repeat function. Accordingly, opaque thermosensitive recording paper can be used. As this kind of thermosensitive recording paper, there are conventionally used thermosensitive recording paper obtained by calendaring paper (Bekk index (JIS P-8119): 120 seconds or below) made of natural pulp to smooth it (Bekk index: 150–1,100 seconds), coating a thermosensitive recording layer thereon, drying it and calendaring the thermosensitive recording layer coated paper to smooth it. As this kind of thermosensitive recording paper, however, attempts are made to use opaque (opacity: 90 to 95%) synthetic paper from the viewpoints of the preservability of the original drawing and high-speed printability, said opaque synthetic paper being used as a support for thermosensitive recording image receiving paper [see, JP-A-63-222891 (the term "JP-A" as used herein means an "unexamined published Japanese patent application", JP-A-62-299391, JP-A-62-148292, JP-A-62-279983, JP-A-62-299390, JP-A-62-87390, JP-A-63-290790, JP-A-63-307988 and JP-A-63-315293].

Thermosensitive recording paper using semi-transparent synthetic paper has high Bekk smoothness (600 to 2500 seconds), is superior in high speed printability and has excellent preservability. However, it is demanded to make improvements in pencil writeability and erasability with erasers, because a degree of smoothness is too high. Further, it is demanded to develop semi-transparent thermosensitive recording paper which allows diazo copying to be made as in electrostatic plotting paper for CAD.

SUMMARY OF THE INVENTION

An object of the present invention is to provide semi-transparent thermosensitive recording paper for printing (drawing) use, which enables high speed printing and diazo copying to be made, allows the addition to lines and correction with pencil to be made after drawing and printing are made on said thermosensitive recording paper, and is excellent in erasability with eraser.

Another object of the present invention is to provide thermosensitive recording paper which enables copying to be made by using tracing paper type synthetic paper as the support for said thermosensitive recording paper and is excellent in high-speed printability, pencil writeability and erasability with eraser by using calcium carbonate as inorganic fine particles for forming the surface layer (paper-like layer) of synthetic paper and properly choosing stretching temperature, stretching ratio and the amount of powder.

The present invention provide a support for thermosensitive recording paper, said support being synthetic paper composed of a laminated film comprising a base layer composed of a biaxially stretched resin film and a paper-like layer (surface layer) composed of a uniaxially stretched film of a thermoplastic resin containing 10 to 50% by weight of calcium carbonate powder in a support made of synthetic paper and to be coated with a thermosensitive color forming layer and said support meeting the following physical properties (i) to (iii):

(i) opacity is 45% or below as measured according to JIS P-8138, (ii) the paper-like layer to be coated with a thermosensitive color forming layer has Bekk smoothness (JIS P-120) of 100 to 300 seconds and a surface roughness (average roughness of central line) Ra of 1.5 $\mu m$ or below as measured according to JIS B-0601, and (iii) the support has a density (JIS P-8118) of not higher than 1.1 g/cm$^3$.

DETAILED DESCRIPTION OF THE INVENTION

Now, the present invention will be illustrated in more detail below.

Preparation of support

The support to be coated with a coating solution for forming the thermosensitive layer of thermosensitive recording paper is tracing paper type (opacity: 5 to 45%) synthetic paper composed of a multi-layer structure. Such synthetic paper is semi-transparent synthetic paper having a density of not higher than 1.1 g/cm$^3$, Bekk smoothness of 100 to 300 sec, surface roughness (Ra) of 1.5 $\mu m$ or below and opacity of 5 to 45%, which is composed of a laminated film comprising a base layer composed of a biaxially stretched film and a paper-like layer composed of a uniaxially stretched film. Said biaxially stretched film used as the base layer is prepared in the following manner. A thermoplastic resin containing 0 to 3% by weight of inorganic fine powder is melt-kneaded in an extruder and extruded through a die into a sheet. The sheet is cooled and again heated to a temperature which is lower by 8° to 15° C. than the melting point (DSC peak temperature) of said thermoplastic resin. The sheet is then stretched 3.5 to 8 times as long at a stretching rate of 5 to 25 m/min and at that temperature by utilizing a difference in a peripheral speed between rollers. Subsequently, a melt-kneaded material of a thermoplastic resin containing 10 to 50% by weight of calcium carbonate powder having a particle diameter of not larger than 1.5 $\mu m$ is extruded through a die into a sheet onto the surface or both sides of said stretched sheet to carry out melt-laminating. The resulting laminate is cooled to a temperature of lower than the melting point of the thermoplastic resin and again heated to a temperature in the vicinity to the melting point of the thermoplastic resin (a temperature ranging from a temperature of lower by 3° C. than the melting point to a temperature of higher by 5° C. than the melting point). The laminate is stretched by 4 to 10 times in the width direction at a stretching rate of 17.5 to 200 m/min by using a tenter. The stretched product is annealed at a temperature which is higher by 2° or 3° C. than the stretching temperature, and trimming is conducted to thereby obtain the laminated stretched film used as the support.

Both Bekk smoothness and surface roughness (Ra) represent a degree of surface smoothness, but the measuring methods thereof are different. The former is macroscopically measured, while the latter is microscopically measured. There is no direct proportional correlation therebetween [see, JP-B-1-35751 (the term "JP-B" as used herein means an "examined Japanese patent publication"); Method for Measuring Printing Smoothness of Paper mainly by Optical Contact Method, written by Shinpei Inamoto (Report of Printing Bureau Laboratory of Ministry of Finance, Vol. 29, No. 9, pp. 605–622, September, 1977].

In the present invention, since there is performance requirement that the support must be semi-transparent from the viewpoints of pencil writeability, erasability with eraser and blue printability in addition to high-speed printability (drawability), tracing paper type synthetic paper having opacity of 45% or below, preferably 28% or below is used and blue printing is made possible. Further, the paper-like layer has such surface smoothness that Bekk smoothness is 100 to 300 sec and surface roughness (Ra) is 1.5 μm or below, preferably 1.0 μm or below from the viewpoints of high-speed printability and high-quality image, and the density of the support is not higher than 1.1 $g/cm^3$ from the viewpoint of a balance between high-quality image and translucency.

The support has a thickness of 40 to 100 μm, preferably 55 to 70 μm.

Examples of the thermoplastic resin which can be used in the base layer and the paper-like layer in the present invention include resins having a melting point of not lower than 155° C. such as polypropylene, polyethylene terephthalate and poly(4-methylpentene-1). Examples of inorganic fine powder used in the base layer include calcium carbonate, calcined clay, diatomaceous earth, talc, titanium oxide, barium sulfate, aluminum sulfate and silica. Inorganic fine powder used in the paper-like layer is calcium carbonate powder. When calcined clay, talc, etc. are used in said layer, high-quality image can not be obtained.

Thermosensitive layer

A coating solution for forming a thermosensitive layer is a solution obtained by dispersing fine particles of a thermosensitive color forming materials in water as a dispersion medium. Concretely, the coating solution is a solution obtained by dispersing an electron donative colorless dye such as Crystal Violet Lactone and an electron accepting compound such as 2,2-bis(4-hydroxyphenyl)propane in the form of fine particles having a particle size of not larger than several μm in an aqueous solution of polyvinyl alcohol. Methods for the preparation thereof are described in JP-B-45-14039, JP-A-55-93492, JP-A-55-14281, etc.

Particles dispersed in the coating solution for the thermosensitive layer have a volume-average particle size of preferably not larger than 8 μm, more preferably not larger than 4 μm. This is because in many cases the thermosensitive color forming layer is generally coated in such an amount as to give a thickness of 5 to 10 μm.

The coating solution is generally coated on the paper-like layer of the support by means of air knife coater. After coating, the coated support is dried and calendared to impart good smoothness to the thermosensitive layer and to provide high-speed printability (Paper for the Information Industry, pp. 178-207, edited by Shigyo Times, 1981).

The semi-transparent thermosensitive recording paper of the present invention is excellent in high-speed printability as well as in pencil writeability and erasability with eraser and gives high-quality image which can be practically well-used.

The present invention is now illustrated in greater detail by reference to the following examples which, however, are not to be construed as limiting the invention in any way.

Preparation of support

Example 1

(1) A resin composition (B) comprising a blend of 97% by weight of polypropylene having melt index (MI) of 0.8 g/10 min and a molting point (DSC peak temperature) having 164° C. and 3% by weight of calcium carbonate having a specific surface area of 10,000 $cm^2/g$, was kneaded in an extruder set to 270° C. and then extruded into a sheet. The sheet was cooled in a cooling apparatus to obtain an unstretched sheet. The sheet was heated to 154° C. and then stretched 5 times in the lengthwise direction at stretching rate of 6 m/min.

(2) A composition (A) for the paper-like layer was obtained by mixing 55% by weight of polypropylene having an MI of 4.0 g/10 min and 164° C. of melting point with 45% by weight of calcium carbonate having a specific surface area of 15,000 $cm^2/g$, a residue on 325-mesh sieve of 8 ppm, a whiteness degree of 92%, a lightness (L value) of 92.2, a hue (a value) of +0.8 and a yellowness (b value) of +1.5. The composition was melt-kneaded in an extruder and extruded into a sheet which was laminated onto both sides of the stretched sheet (stretched 5 times) prepared in the above item (1). The laminate was cooled to 60° C., then heated to 164° C. and stretched 7.5 times in the width direction by using a tenter. The stretched laminate was annealed at 166° C., cooled to 60° C. and trimmed to obtain a multilayer stretched resin film (support) having a three layer (A/B/A, thickness: 14/30/14 μm) structure.

The support was found to have opacity of 24.0%, Bekk smoothness of 200 sec, surface roughness (Ra) of 0.71 μm, Rmax of 7.2 μm and a density of 1.00 $g/cm^3$.

Example 2

Both sides of the paper-like layer of the support obtained in Example 1 were coated with a 1% aqueous solution of ethylene urea primer in such an amount as to give 1 $g/m^2$ on a solid basis. The coated support was dried to obtain a support having a thickness of 60 μm, opacity of 20%, Bekk smoothness of 280 sec, Ra of 0.64 μm, Rmax of 6.6 μm and a density of 1.02 $g/cm^3$.

Comparative Example 1

The procedure of Example 2 was repeated except that calcined clay having a particle size of 1 μm was used in place of calcium carbonate used in the paper-like layer to obtain semi-transparent synthetic paper having physical properties indicated in Table 1.

Comparative Example 2

(1) A mixture of 70% by weight of polypropylene having melt index (MI) of 0.8 g/10 min and 5% by weight of high-density polyethylene was blended with 25% by weight of calcium carbonate. The resulting blend (B) was kneaded in an extruder set to 270° C. and extruded into a sheet which was then cooled in a cooling apparatus to obtain an unstretched sheet. The sheet was heated to 140° C. and then stretched 5 times in the lengthwise direction.

(2) A composition (A) for the paper-like layer obtained by mixing 45% by weight of polypropylene having an MI of 4.0 g/10 min with 55% by weight of calcium carbonate having a specific surface area of 15,000 $cm^2/g$ and a residue on 325-mesh sieve of 8 ppm, was melt-kneaded in an extruder and extruded into a sheet which was then laminated onto both sides of the stretched sheet (stretched 5 times) prepared in the above item (1). The laminate was cooled to 60° C., then heated to 160° C. and stretched 7.5 times in the width direction by a tenter. The stretched laminate was annealed at 165° C., cooled to 60° C. and trimmed to obtain opaque synthetic paper having a three-layer structure (A/B/A, thickness: 15/30/15 μm).

The physical properties thereof are shown in Table 1.

Examples 3 to 5 and Comparative Examples 3 to 7

The procedure of Example 2 or Comparative Example 2 was repeated except that the amounts of calcium carbonate and polypropylene used in the base layer and the paper-like layer, stretching temperatures and the thicknesses of the base layer and the paper-like layer were changed to obtain supports having physical properties indicated in Table 1.

Preparation of coating solution for thermosensitive layer 20 kg of Crystal Violet Lactone was dispersed in a 10% aqueous solution of polyvinyl alcohol (a degree of saponification: 98%, a degree of polymerization: 500) in a 300 l ball mill overnight. Similarly, 20 kg of 2,2-bis(4-hydroxyphenyl)propane was dispersed in a 10% aqueous solution of polyvinyl alcohol in a 300 l ball mill overnight. Both dispersions were mixed with each other in such a proportion as to give a ratio of Crystal Violet Lactone: 2,2-bis(4-hydroxyphenyl)propane of 1:5 by weight. 5 kg of precipitated calcium carbonate was added to 20 kg of the mixed solution and thoroughly dispersed therein to form a coating solution.

Preparation of thermosensitive recording paper

One side of each support having physical properties indicated in Table 1, prepared in the aforesaid examples, was coated with the coating solution in such an amount as to give a coating weight of 6 $g/m^2$ on a solid basis. The coating was carried to by means of air knife coater. The coated support was dried in a hot-air dryer at 50° C. and machine-calendared to obtain thermosensitive recording paper.

Recording on thermosensitive recording paper

Drawing and printing were carried out by using large-sized thermal plotter "TM 1100" (trade name) (Manufactured by Graphtech) having resolution of 16 dots/mm and a recording rate of 25 mm/sec. The ranking of the quality of image was made. A ranking was numbered from 1 to 11 in order of favorable results.

A line was drawn on the printed paper with a pencil by the same force. The depth of pencilings was measured to thereby make evaluation.

Further, the printed recording paper was used as the original and the diazo copying thereof was carried out under the same exposure conditions. A ranking of good, fair or bad was made by clarity of reproduction.

Further, black solid printing was made on another thermosensitive recording paper to evaluate image.

These results and the order of overall judgement of the original drawing used as the original drawing for diazo copying and the original drawing for photographing with projector are shown in Table 1.

TABLE 1

| | Example | | Comp. Ex. | | Example | | Comp. Ex. | | | | |
|---|---|---|---|---|---|---|---|---|---|---|---|
| | 1 | 2 | 1* | 2 | 3 | 4 | 3 | 4 | 5 | 6 | 7 |
| **Support** | | | | | | | | | | | |
| Composition of paper-like layer (%) | | | | | | | | | | | |
| Polypropylene | 55 | 55 | 55 | 45 | 70 | 55 | 95 | 55 | 40 | 30 | 100 |
| Calcium carbonate | 45 | 45 | — | 55 | 30 | 45 | 5 | 45 | 60 | 70 | 0 |
| Calcined clay | — | — | 45 | — | — | — | — | — | — | — | — |
| Opacity (%) | 24 | 20 | 33 | 94 | 16 | 27.9 | 20 | 60 | 60 | 70 | 8 |
| Bekk smoothness (sec.) | 200 | 280 | 70 | 400 | 280 | 160 | 620 | 220 | 150 | 154 | 5000 |
| Surface roughness (Ra) (μm) | 0.71 | 0.64 | 0.77 | 0.67 | 0.32 | 0.74 | 0.30 | 0.70 | 0.80 | 0.76 | 0.24 |
| Surface roughness (Rmax) (μm) | 7.2 | 6.6 | 13.1 | 8.0 | 6.8 | 7.8 | 6.0 | 8.0 | 12.8 | 11.3 | 3.3 |
| Density ($g/cm^3$) | 1.00 | 1.02 | 1.02 | 0.80 | 0.80 | 0.99 | 0.85 | 1.02 | 1.01 | 1.00 | 0.80 |
| Thickness (μm) | 58 | 60 | 60 | 60 | 60 | 60 | 60 | 110 | 60 | 60 | 60 |
| Evaluation of thermosensitive recording paper | | | | | | | | | | | |
| Recording density | good | good | bad | good | good | good | bad | good | good | good | bad |
| Dot reproducibility | good | good | bad | bad | good | good | very good | good | bad | bad | very good |
| Sticking | not sticked | not sticked | not sticked | not sticked | sticked | not sticked | sticking | not sticking | not sticking | not sticking | sticking |
| Order of judgement of printability | 3 | 2 | 11 | 8 | 5 | 1 | 6 | 4 | 9 | 10 | 7 |
| Pencil writeability | fair | fair | good | fair | fair | fair | bad | fair | fair | good | bad |
| Erasability with eraser | good | good | bad | good | good | good | bad | good | good | good | bad |
| Diazo-copyability | good | good | fair | bad | good | good | good | bad | bad | bad | good |
| Order of overall judgement | 4 | 2 | 5 | 9 | 3 | 1 | 6 | 8 | 10 | 11 | 7 |

*poor hue

While the present invention has been described in detail and with reference to specific embodiments thereof, it is apparent to one skilled in the art that various changes and modifications can be made therein without departing from the spirit and the scope of the present invention.

What is claimed is:

1. A support for thermosensitive recording paper, said support being synthetic paper composed of a laminated film comprising a base layer composed of a biaxially stretched resin film, said resin used in said base layer having a melting point of not lower than 155° C., and a paper-like layer composed of a uniaxially stretched film of a thermoplastic resin containing 10 to 50% by weight of calcium carbonate powder in a support made of synthetic paper and to be coated with a thermosensitive color forming layer and said support meeting the following physical properties (i) to (iii):

(i) opacity is 45% or below as measured according to JIS P-8138, (ii) the paper-like layer to be coated with a thermosensitive color forming layer has Bekk smoothness of 100 to 300 sec and surface roughness $R_a$ of 1.5 μm or below and (iii) the support has a density of not higher than 1.1 $g/cm^3$.

2. A support for thermosensitive recording paper as claimed in claim 1, wherein said opacity is 28% or below.

3. A support for thermosensitive recording paper as claimed in claim 1, wherein said paper-like layer has surface roughness Ra of 1.0 μm or below.

4. A support for thermosensitive recording paper as claimed in claim 1, wherein said resin used in the paper-like layer has a melting point of not lower than 155° C.

* * * * *